(12) United States Patent
Lindsay

(10) Patent No.: US 7,931,338 B2
(45) Date of Patent: Apr. 26, 2011

(54) VEHICLE SEAT LOCKING ASSEMBLY

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 12/433,386

(22) Filed: Apr. 30, 2009

(65) Prior Publication Data

US 2010/0276977 A1 Nov. 4, 2010

(51) Int. Cl.
*B60N 2/20* (2006.01)
*B60N 2/36* (2006.01)

(52) U.S. Cl. .......... 297/378.13; 297/378.12; 297/354.12

(58) Field of Classification Search .............. 297/378.13, 297/354.12, 361.1, 376, 378.12
See application file for complete search history.

(56) References Cited

U.S. PATENT DOCUMENTS

| | | | |
|---|---|---|---|
| 2,927,655 A | | 3/1960 | Leslie et al. |
| 3,788,685 A | * | 1/1974 | Leichtl ................. 297/378.13 X |
| 4,335,917 A | * | 6/1982 | Izuno et al. ......... 297/354.12 X |
| 4,408,799 A | * | 10/1983 | Bowman ................. 297/354.12 |
| 4,715,655 A | * | 12/1987 | Katsumoto et al. .. 297/354.12 X |
| 4,881,767 A | * | 11/1989 | Kondo ................. 297/378.13 X |
| 5,562,325 A | | 10/1996 | Moberg |
| 5,582,453 A | * | 12/1996 | Leuchtman et al. ..................... 297/378.13 X |
| 5,692,803 A | * | 12/1997 | Luik et al. ............ 297/378.13 X |
| 6,012,776 A | | 1/2000 | Schneider et al. |
| 6,312,055 B1 | | 11/2001 | Uematsu |
| 6,435,616 B1 | * | 8/2002 | Travis et al. ............. 297/378.12 |
| 6,769,741 B2 | * | 8/2004 | Denning ................. 297/378.13 |
| 6,811,199 B2 | | 11/2004 | Nozaki |
| 7,156,461 B2 | | 1/2007 | Bolte et al. |
| 7,255,398 B2 | * | 8/2007 | Tokui et al. .......... 297/378.12 X |
| 7,494,186 B2 | * | 2/2009 | Paing et al. ............. 297/378.12 |
| 7,578,556 B2 | * | 8/2009 | Ohba et al. ........... 297/378.12 X |
| 7,635,166 B2 | * | 12/2009 | Ishikawa .............. 297/378.13 X |
| 7,641,282 B2 | * | 1/2010 | Hinata et al. ......... 297/378.13 X |
| 2006/0125302 A1 | | 6/2006 | Shinozaki et al. |
| 2007/0138854 A1 | * | 6/2007 | Paing et al. ............. 297/378.12 |
| 2010/0213747 A1 | * | 8/2010 | Lindsay .................. 297/378.13 |

\* cited by examiner

*Primary Examiner* — Rodney B White
(74) *Attorney, Agent, or Firm* — Rankin Hill & Clark LLP

(57) ABSTRACT

A vehicle seat locking assembly includes a vehicle seat locking pin for locking an associated vehicle seat back in a desired position when the locking pin is in a locked position, and a vehicle seat lever for moving the locking pin. One of the locking pin and the lever has a cam surface, and the other of the locking pin and the lever have a cam follower cooperatively engaged with the cam surface to move the locking pin to an unlocked position when the lever is moved to a release position.

19 Claims, 3 Drawing Sheets

VEHICLE SEAT LOCKING ASSEMBLY

BACKGROUND

The present disclosure generally relates to vehicle seats and locking assemblies therefor. More particularly, the present disclosure relates to a cam-slot recliner lever assembly for a vehicle seat.

Many vehicles include seats where a seat back folds toward a base of the seat. Such seats are movable between an upright position and a collapsed position. With the seat in an upright position, an operator typically pulls a recliner/fold-down lever connected with a latch which allows the seat back to pivot toward the base into the collapsed position. In addition, or in the alternative, these seats can be movable among a variety of reclining positions.

Current recline levers for vehicle seats often include cables or linkages that route from the lever to the recliner or latch mechanism to open it, thus allowing adjustment. Some seats have latches that latch to an adjacent vehicle wall (e.g., a latch in the seat attaches to a striker on the vehicle body). This presents a poor appearance and potential source of injury due to the protruding striker.

It is known to hide the striker, such as by providing a fold-down striker which allows the user to fold the striker down to the vehicle wall when not in use. However, a drawback of this arrangement is that it requires an extra step to the user when hiding the striker or deploying the striker. In another arrangement, the seat latch is provided on the vehicle wall with the striker mounted to the movable seat back. In one known arrangement of this type, the striker automatically folds down against the seat when the seat is folded through a cable system. This and other prior art recline latches are typically complex, costly and/or visually unappealing.

BRIEF DESCRIPTION

According to one aspect, a vehicle seat locking assembly includes a vehicle seat locking pin for locking an associated vehicle seat back in a desired position when the locking pin is in a locked position and a vehicle seat lever for moving the locking pin. One of the locking pin and lever has a cam surface, and the other of the locking pin and the lever has a cam follower cooperatively engaged with the cam surface to move the locking pin to an unlocked position when the lever is moved to a release position.

According to another aspect, a vehicle seat locking assembly includes a pivotal seat back mounted in an associated vehicle, a locking pin slidably mounted on the seat back, and a lever rotatably mounted on the seat back. The locking pin is movable between a protruding locked position for locking the seat back in a recline position and a retracted unlocked position for allowing pivotal movement of the seat back. The lever is movable between a rest position corresponding to the protruding locked position of the locking pin and a release position corresponding to the retracted unlocked position of the locking pin. A camming relationship between the lever and the locking pin transfers rotatable movement of the lever into slidable movement of the locking pin such that movement of the lever from the rest position to the release position moves the locking pin from the protruding locked position to the retracted unlocked position.

According to still another aspect, a vehicle seat assembly includes a seat back pivotally disposed in an associated vehicle, a locking pin slidably mounted to the seat back for selectively locking the seat back in an upright position and a lever rotatably mounted to the seat back in camming relation with the locking pin for selectively moving the locking pin from an extended locked position to a retracted unlocked position.

According to still yet another aspect, a simple, self-contained recliner mechanism employs a cam-slotted pin that secures a vehicle seat back to an adjacent vehicle wall by entering a recess defined in the vehicle wall (or some intermediate structure secured to the wall). A handle is cooperatively engaged with the cam-slotted pin, such that a cam follower on the handle pulls the pin into a lever body to house the pin when the lever is pulled upward, thus releasing the seat to allow pivotal movement thereof. If desired, the number and location of reclining positions can be controlled by the number and location of holes or recesses provided in the vehicle wall. A spring can be provided that acts on the lever to return the lever to its stowed or rest position, which pushes the cam-slotted pin out to its locked position. The spring can be wound concentric with the pin or act against the lever and the lever housing.

DETAILED DESCRIPTION

Figure 1:
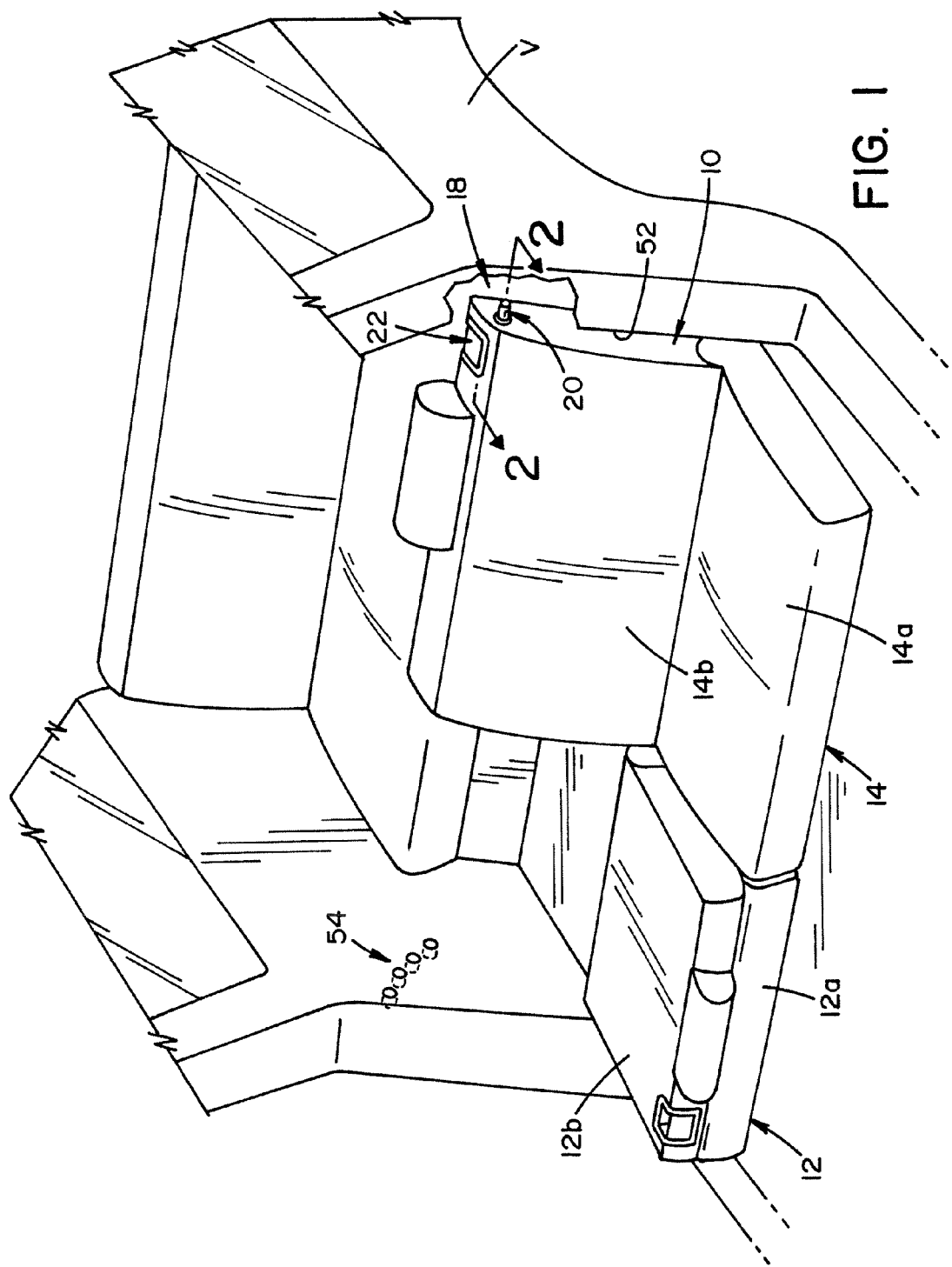
FIG. 1 is a partial perspective view of an interior of a vehicle, including a row of vehicle seats that each includes a seat base and fold-down back, the seat back having a locking assembly for locking the seat back in a desired position.

Referring now to the drawings, wherein the showings are for purposes of illustrating one or more exemplary embodiments and not for purposes of limiting same, the interior of a vehicle V is shown in FIG. 1 where the vehicle includes a row of vehicle seats 10, including first vehicle seat or seat assembly 12 and second vehicle seat or seat assembly 14. In the illustrated embodiment, the seats 12, 14 are shown in a 30/70 split configuration, though this is not required. The seats 12, 14 each respectively include a seat base 12a, 14a and a pivotal seat back 12b, 14b. As is known and understood by those skilled in the art, the seat backs 12b, 14b can be pivotally disposed in the vehicle V.

A vehicle seat locking assembly is provided for each vehicle seat 12, 14 for selectively locking respective seat backs 12b, 14b of the seats 12, 14 in a desired upright position. Because the vehicle seat locking assemblies of the seats 12, 14 are mirror images of one another, only vehicle seat locking assembly 18 of vehicle seat 14 will be described in further detail herein. The locking assembly 18 includes the pivotal seat back 14b of the vehicle V, a vehicle seat locking pin 20 for locking the seat back 14b in a desired position when the locking pin 20 is in a locked position and a vehicle seat lever 22 for moving the locking pin 20. As will be described in more detail below, one of the locking pin 20 and the lever 22 has a cam surface and the other of the locking pin 20 and the lever 22 has a cam follower cooperatively engaged with the cam surface to move the locking pin 20 to an unlocked position when the lever 22 is moved to a release position. This cooperative engagement of the cam follower with the cam surface also moves the locking pin 20 to a locked position when the lever is moved to a rest position.

Figure 2:
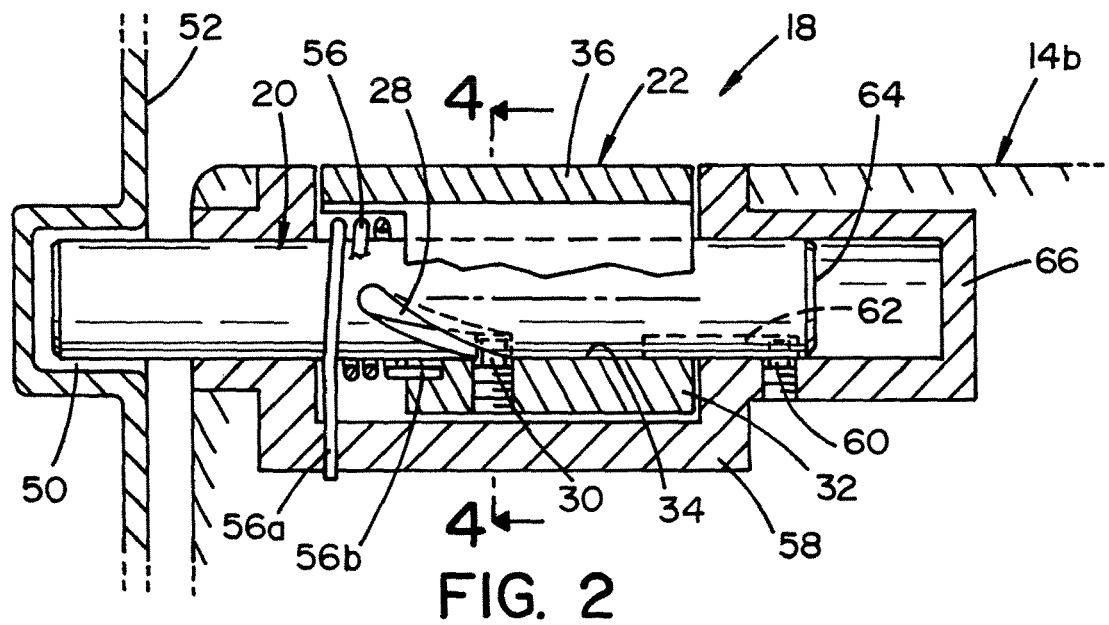
FIG. 2 is a cross-sectional view of one of the seat's locking assemblies taken along the line 2-2 of FIG. 1.
Figure 3:
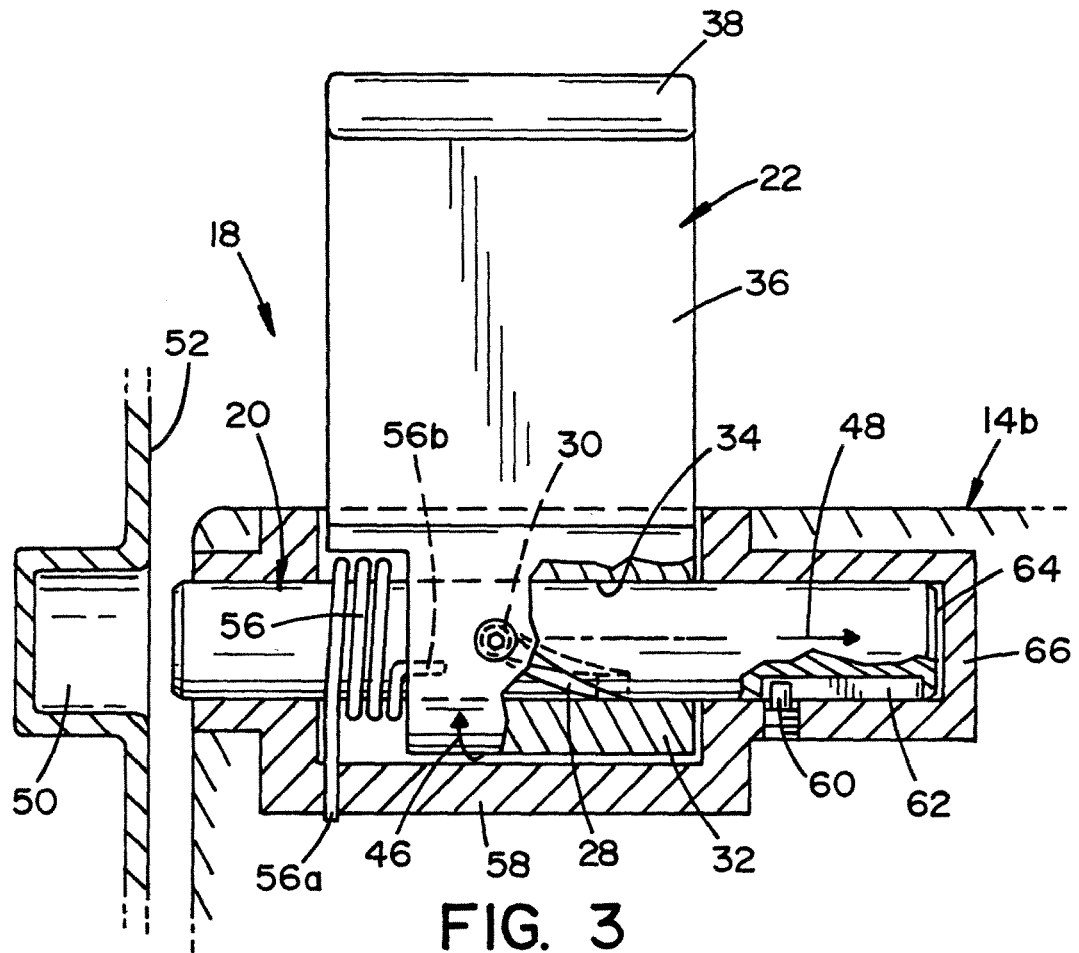
FIG. 3 is a cross-sectional view of the lock assembly similar to FIG. 2, but showing a lever of the lock assembly in a release position.

In the illustrated embodiment, with additional reference to FIGS. 2 and 3, the cam surface is that which defines cam slot 28 in the locking pin 20, and the cam follower is a guide pin 30 of the lever 22 that is received in the cam slot 28. More particularly, in the illustrated embodiment, the locking pin 20 is slidably mounted to or on the seat back 14b for selectively locking the seat back 14b in an upright position. The locking pin 20 is movable between the protruding locked position (shown in FIGS. 1 and 2) for locking the seat back in an upright or recline position and a retracted unlocked position (FIG. 3) for allowing pivotal movement of the seat back 14b. The lever 22 is rotatably mounted to the seat back 14b in camming relation with the locking pin 20 for selectively moving the locking pin 20 from the extended locked position to the retracted unlocked position. More particularly, the lever 22 is movable between the rest position (FIGS. 1 and 2), which corresponds to the protruding locked position of the locking pin 20, and a release position (FIG. 3), which corresponds to the retracted unlocked position of the locking pin 20. The camming relationship between the lever 22 and the locking pin 20 transfers rotatable movement of the lever 22 into slidable movement of the locking pin 20, as will be further described below, such that movement of the lever 22 from the rest position to the release position moves the locking pin 20 from the protruding locked position to the retracted unlocked position.

Figure 4:
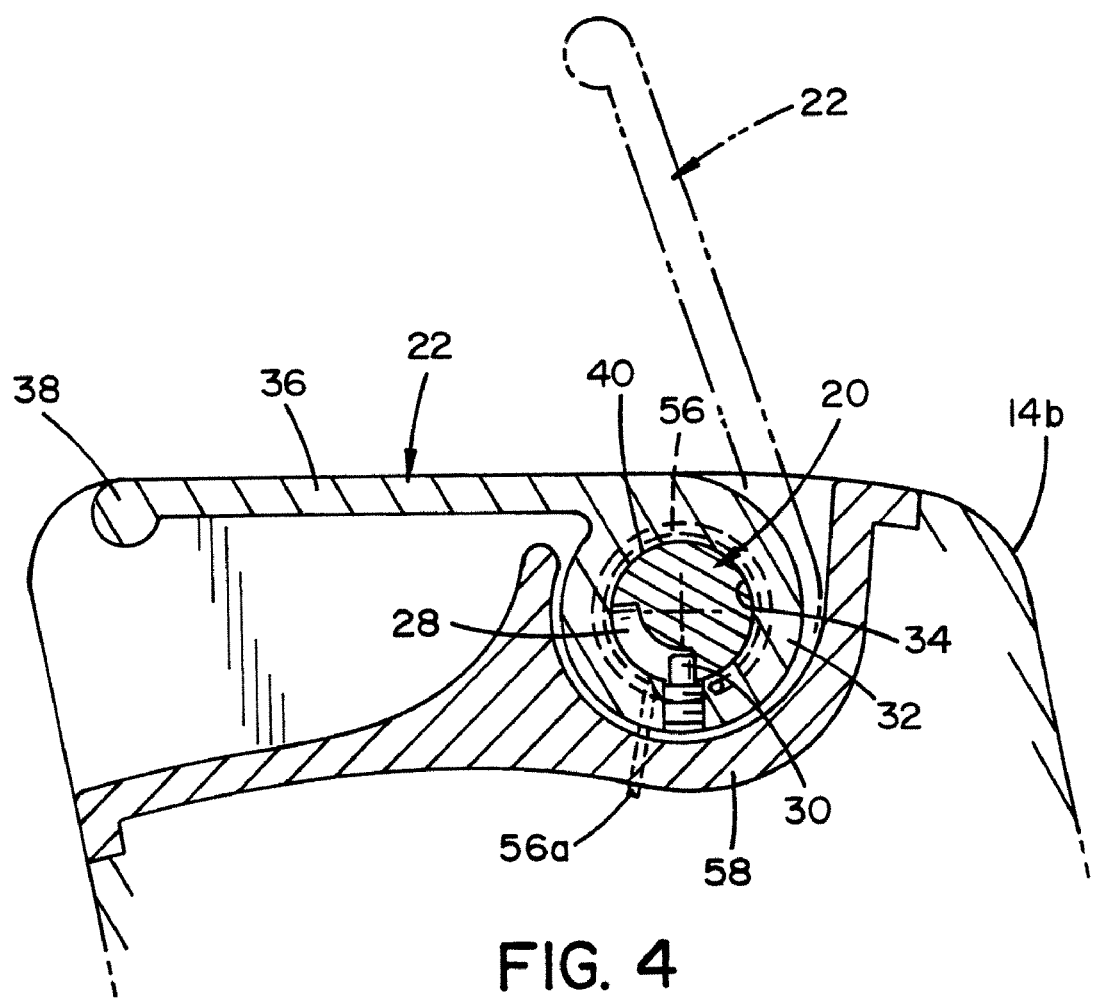
FIG. 4 is a cross-sectional view of the locking assembly taken along the line 4-4 of FIG. 2.

As shown, with further reference to FIG. 4, the lever 22 includes a sleeve portion 32 defining a bore 34 in which the locking pin 20 is received. The lever 22 further includes a handle portion 36 extending from the sleeve portion 32. A distal end 38 of the handle portion 36 can be enlarged as shown to facilitate gripping of the handle portion 36. In the illustrated embodiment, the guide pin 30 of the sleeve portion 32 extends radially inwardly into the bore 34 from the sleeve portion 32 and into the cam slot 28 defined in the locking pin 20 to form a camming relationship between the lever 22 and the locking pin 20. By this arrangement, the slidable movement of the locking pin 20 between the unlocked position and the locked position is axial relative to the sleeve portion 32.

Figure 5:
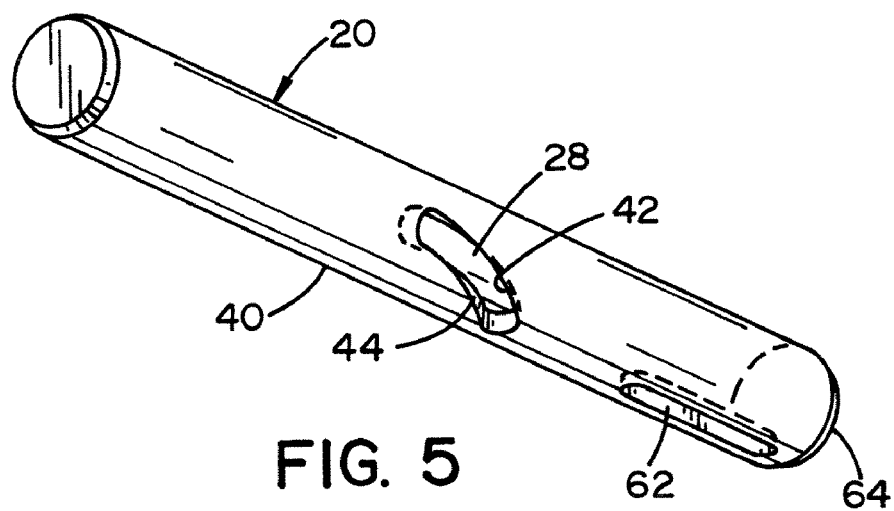
FIG. 5 is a perspective view of a locking pin of the locking assembly of FIGS. 1-4.

With reference to FIG. 5, the cam slot 28 can be a groove or channel cut radially into an outer surface 40 of the locking pin 20 and thus defined by outer walls 42, 44. The outer walls 42, 44 provide or define the cam surface against which a guide pin 30 acts. In particular, rotation of the lever 22 from the rest position to the release position causes the locking pin 20 to move from the locked position to the unlocked position through the guide pin 30 acting against a portion (i.e., walls 42, 44) of the locking pin 20 defining the cam slot 28. Accordingly, movement of the handle portion 36 of the lever 22 to the release position rotates the sleeve portion 32 and the guide pin 30 in a first rotatable direction (indicated by arrow 46). Rotation of the guide pin 30 in this first direction moves the locking pin 20 axially inwardly (indicated by arrow 48) toward the unlocked position due to the guide pin 30 being received in the cam slot 28 of the locking pin 20. Rotation of the sleeve portion 32 and the guide pin 30 in a second, opposite direction (i.e., a direction opposite that indicated by arrow 46) moves the locking pin 20 axially outwardly (i.e., a direction opposite that is indicated by arrow 48) toward its locked position, which is also due to the guide pin 30 being received in the cam slot 28 of the locking pin 20.

When the locking pin 20 is in its protruding locked position, the locking pin 20 protrudes from the seat back 14b, particularly a lateral side thereof, and is received in a recess 50 defined in a vehicle body portion 52, such as a vertical inside wall of the vehicle V. The recess 50 can be one of a plurality of recesses (see plurality of recesses 54 illustrated in FIG. 1 for seat back 12b) defined in the vehicle body portion 52 for receiving the locking pin 20 when in its protruding locked position. Each of the plurality of recesses can correspond to a particular recline position for the seat back.

The locking assembly 18 can additionally include a bias mechanism urging the locking pin 20 toward the locked position. In the illustrated embodiment, the bias mechanism is a spring 56 rotatably urging the lever 22 in the second rotatable direction toward its rest position, which thereby urges the locking pin 20 toward the protruding locking position. The locking assembly 18 can additionally include a housing member 58 that mounts the locking pin 20 and a lever 22 in or to the vehicle seat 14, particularly the seat back 14b. In the illustrated embodiment, the seat back 14b includes the housing member 58 to which the locking pin 20 and the lever 22 are mounted. In addition, at least one of the housing member 58 or the locking pin 20 can be configured to limit relative rotation between the housing member 58 and the locking pin 20. In the illustrated embodiment, the housing member 58 includes an anti-rotation pin 60 that is received within an anti-rotation slot 62 of the locking pin 20. As is shown, the anti-rotation slot 62 can be generally parallel to an axis of locking pin 20. The anti-rotation slot 62 is movable along the anti-rotation pin 60 as the locking pin 20 moves relative to the housing member 58 (i.e., as the locking pin 20 moves between an unlocked position and a locked position).

In the illustrated embodiment, the spring 56 is disposed within the housing member 58 to urge the locking pin 20 toward the locked position, wherein the locking pin 20 protrudes outwardly from the housing member 58 when the seat back 14b is locked in a desired position. The lever 22 moves the locking pin 20 toward the unlocked position against the urging of the spring 56 when the lever 22 is moved toward the release position. The locking pin 20 is retracted within the housing member 58 when in the unlocked position for allowing movement of the seat back 14b. Specifically, the spring 56 can have a first end 56a secured to the housing member 58 and a second end 56b secured to the rotatably mounted lever 22. The illustrated spring 56 being a coil spring urges the lever 22 toward its rest position. It is to be understood and appreciated that other bias mechanisms and/or other types of spring arrangements could be employed. For example, a spring could be employed between the inner end 64 of the locking pin 20 and a sidewall 66 of the housing member 58. Such a spring would urge the locking pin 20 toward its locked position, which in turn would urge the lever 22 toward its rest position through the camming relation between the locking pin 20 and the lever 22.

Advantageously, the locking assembly 18 does not require any cable actuators or other linkages. Additionally, no strikers protrude from the vehicle wall which are known to have a poor appearance and present a potential for injury, when the locking assembly 18 is used. The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle seat locking assembly, comprising:
   a vehicle seat locking pin for locking an associated vehicle seat back in a desired position when said locking pin is in a locked position, said locking pin received in a locking recess when in said locked position; and
   a vehicle seat lever for moving said locking pin, one of said locking pin and said lever having a cam surface and the other of said locking pin and said lever having a cam follower cooperatively engaged with said cam surface to move said locking pin to an unlocked position when said lever is moved to a release position, said locking pin removed from said locking recess when in said unlocked position.

2. The vehicle seat locking assembly of claim 1 wherein cooperative engagement of said cam follower with said cam surface also moves said locking pin to a locked position when said lever is moved to a rest position.

3. The vehicle seat locking assembly of claim 1 wherein said cam surface defines a cam slot in said locking pin and said cam follower is a guide pin received in said cam slot.

4. A vehicle seat locking assembly, comprising:
   a vehicle seat locking pin for locking an associated vehicle seat back in a desired position when said locking in is in a locked position;
   a vehicle seat lever for moving said locking pin, one of said locking pin and said lever having a cam surface and the other of said locking pin and said lever having a cam follower cooperatively engaged with said cam surface to move said locking pin to an unlocked position when said lever is moved to a release position, said cam surface defines a cam slot in said locking pin and said cam follower is a guide pin received in said cam slot, wherein said lever includes:
      a sleeve portion defining a bore in which said locking pin is received;
      and
      a handle portion extending from said sleeve portion, wherein said guide pin extends radially inwardly into said bore from said sleeve portion and movement of said locking pin between said unlocked position and a locked position is axial relative to said sleeve portion.

5. The vehicle seat locking assembly of claim 4 further including a bias mechanism urging said locking pin toward said locked position.

6. The vehicle seat locking assembly of claim 5 wherein said bias mechanism is a spring rotatably urging said lever in said second direction toward a rest position, said rest position of said lever corresponding to said locked position of said lock pin.

7. The vehicle seat locking assembly of claim 4 further including a housing member that mounts said locking pin and said lever in an associated vehicle seat.

8. The vehicle seat locking assembly of claim 7 wherein at least one of said housing member or said locking pin is configured to limit relative rotation between said housing member and said pin.

9. The vehicle seat locking assembly of claim 8 wherein said housing member includes an anti-rotation pin received within an anti-rotation slot of said locking pin, said anti-rotation slot generally parallel to an axis of said locking pin, said anti-rotation slot moveable along said anti-rotation pin as said locking pin moves between the unlocked position and said locked position.

10. The vehicle seat locking assembly of claim 1 further including:
    a housing member that mounts said locking pin and said lever in the associated vehicle seat back; and
    a spring disposed within said housing member to urge said locking pin toward a locked position wherein said locking pin protrudes outwardly from said housing member when the associated vehicle seat back is locked in said desired position, said lever moving said locking pin toward said unlocked position against the urging of said spring when said lever is moved toward said release position, wherein said locking pin is retracted within said housing member when in said unlocked position for allowing movement of the associated seat back.

11. A vehicle seat locking assembly, comprising:
    a pivotal seat back mounted in an associated vehicle;
    a locking pin slidably mounted on said seat back, said locking pin movable between a protruding locked position for locking the seat back in a recline position and a retracted unlocked position for allowing pivotal movement of the seat back;
    a lever rotatably mounted on said seat back, said lever movable between a rest position corresponding to said protruding locked position of said locking pin and a release position corresponding to said retracted unlocked position of said locking pin, a camming relationship between said lever and said locking pin transferring rotatable movement of said lever into slidable movement of said locking pin such that movement of said lever from said rest position to said release position moves said locking pin from said protruding locked position to said retracted unlocked position.

12. The vehicle seat locking assembly of claim 11 said lever includes a sleeve portion defining a bore in which said locking pin is received and a handle portion extending from said sleeve portion, said sleeve portion includes a guide pin received in a cam slot defined in said locking pin to form said camming relationship between said lever and said locking pin.

13. The vehicle seat locking assembly of claim 11 further including a spring urging said lever rotatably toward said rest position, which thereby urges said locking pin toward said protruding locking position.

14. A vehicle seat locking assembly, comprising:
    a pivotal seat back mounted in an associated vehicle;
    a locking pin slidably mounted on said seat back, said locking pin movable between a protruding locked position for locking the seat back in a recline position and a retracted unlocked position for allowing pivotal movement of the seat back;
    a lever rotatably mounted on said seat back, said lever movable between a rest position corresponding to said protruding locked position of said locking pin and a release position corresponding to said retracted unlocked position of said locking pin, a camming relationship between said lever and said locking pin transferring rotatable movement of said lever into slidable movement of said locking pin such that movement of said lever from said rest position to said release position moves said locking pin from said protruding locked position to said retracted unlocked position; and
    a plurality of recesses defined in an associated vehicle body portion for receiving said locking pin when in said protruding locked position, each recess corresponding to a recline position for said seat back.

15. The vehicle seat locking assembly of claim 11 wherein said seat back includes a housing member to which said locking pin and said lever are mounted, said housing member preventing rotation of said locking pin when said lever is rotated.

16. The vehicle seat locking assembly of claim 15 wherein said locking pin protrudes from said housing member laterally relative to said seat back and said lever extends upwards from said seat back when in said release position.

17. A vehicle seat assembly, comprising:
   a seat back pivotally disposed in an associated vehicle;
   a locking pin slidably mounted to said seat back for selectively locking said seat back in an upright position; and
   a lever rotatably mounted to said seat back in camming relation with said locking pin for selectively moving said locking pin from an axially extended locked position wherein said locking pin is received in a locking recess of an associated vehicle body to an axially retracted unlocked position wherein said pin is removed from said locking recess.

18. The vehicle seat assembly of claim 17 wherein said lever includes one of a guide pin and a cam slot and said locking pin includes the other of said guide pin and said cam slot, said guide pin received in said cam slot.

19. The vehicle seat assembly of claim 18 wherein said lever includes said guide pin and said locking pin includes said cam slot, rotation of said lever from a rest position to a release position causes said locking pin to move from said locked position to said unlocked position through said guide pin acting against a portion of said locking pin defining said cam slot.

* * * * *